(12) United States Patent
Conde et al.

(10) Patent No.: US 8,743,064 B2
(45) Date of Patent: Jun. 3, 2014

(54) GESTURE ORBIT DESIGN

(75) Inventors: Robert William Conde, Arlington, VA (US); Stefan Novak, Arlington, VA (US); Paige Thomas Scaperoth, Bethesda, MD (US); Jonathan C. Ruel, Washington, DC (US)

(73) Assignee: A.I. Solutions, Inc., Lanham, MD (US)

( * ) Notice: Subject to any disclaimer, the term of this patent is extended or adjusted under 35 U.S.C. 154(b) by 253 days.

(21) Appl. No.: 13/234,725

(22) Filed: Sep. 16, 2011

(65) Prior Publication Data

US 2012/0068950 A1    Mar. 22, 2012

Related U.S. Application Data

(60) Provisional application No. 61/383,988, filed on Sep. 17, 2010.

(51) Int. Cl.
*G06F 3/041*   (2006.01)

(52) U.S. Cl.
USPC .............................. 345/173; 701/13; 701/531

(58) Field of Classification Search
None
See application file for complete search history.

(56) References Cited

U.S. PATENT DOCUMENTS

| | | | |
|---|---|---|---|
| 5,473,746 A * | 12/1995 | Pritt et al. | 715/784 |
| 5,987,363 A * | 11/1999 | Quan et al. | 701/13 |
| 8,260,551 B2 * | 9/2012 | Janky et al. | 701/469 |
| 2009/0322700 A1 * | 12/2009 | D'Souza et al. | 345/174 |

\* cited by examiner

*Primary Examiner* — Jason Olson
(74) *Attorney, Agent, or Firm* — Staas & Halsey LLP

(57) ABSTRACT

A computing apparatus and method of manipulating a displayed orbit of an object by detecting a gesture having a correspondence between body movements as the gesture and a resulting change to one or more orbital parameters within a displayed orbit system, changing an orbital parameter of the displayed orbit system according to detection of the gesture, and changing visualization on the computer display screen of the orbit system according to the change to the orbital parameter.

6 Claims, 11 Drawing Sheets

GESTURE ORBIT DESIGN

CROSS-REFERENCE TO RELATED APPLICATIONS

This application is based upon and claims priority to prior U.S. Provisional Patent Application No. 61/383,988 filed on Sep. 17, 2010 in the US Patent and Trademark Office, the entire contents of which are incorporated herein by reference.

FIELD

The embodiments relate to computer implemented gesture orbit design.

BACKGROUND

Traditionally, computer based satellite orbit design has been limited to standard mouse and keyboard input interfaces. For example, a user might utilize a graphical user interface (GUI) on a computer display screen 10 by typing in the numerical values of orbital parameters in a visual orbit system 20 one by one using the keyboard in conjunction with text input controls (FIG. 1), or change the orbital parameters using "slider" controls in conjunction with a mouse (FIG. 2). Often this manipulation is accompanied by a visualization which gives the user feedback on how changes to the orbital parameters affect the orbit.

The viewpoint configuration of the orbit visualization might be controlled by keyboard input, for example by using the left or right arrow keys or by manipulation of the visualization surface (displayed) direction arrows by the mouse (FIG. 3). A viewpoint might look directly at the central body's equator, the central body's planetary poles, or anywhere in between.

This traditional approach to computer based design of a satellite orbit in relation to a central body has several disadvantages:

- Neither control scheme provides a context for what is being manipulated—it simply allows the user to increase or decrease an opaque value. In other words, there is no connection between the method of manipulation and the nature of the value being manipulated.
- Both control schemes are graphically segregated from the visualization, leading to a cognitive disconnect between the two. In other words, it is up to the user to recognize the mapping of the control value to the state of the orbit visualization.
- The segregation of viewpoint and orbit manipulation control schemes requires both a cognitive and screen positional shift when switching between the two, introducing workflow inefficiencies.
- Continuous cyclic parameters do not map well and end up appearing as if they have finite ranges. For example, a "slider" control mapped to an angle might have a range of 0 degrees to 360 degrees. However, this does not reflect the angle's continuous nature.

In addition, even if satellite orbit design was performed on a multi-touch enabled device in FIGS. 1, 2 and 3, it would only map the traditional user interface elements using the touch enabled controls provided by the software platform, namely a touch enabled text or command input or a touch enabled "slider" in FIGS. 1, 2 and 3.

SUMMARY

The embodiments of the present invention relate to the ability to design and explore on a computer display an object (e.g., a satellite) orbiting another object (e.g., a spherical central body) more intuitively than traditional methods by utilizing gestures, for example touch gestures, directly co-relatable to a target visual change of one or more orbital elements 30 of an orbit system on a computational device (e.g., computer, tablet computer, mobile phone) equipped with a touch screen interface.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF EMBODIMENT(S)

The following definitions can apply for embodiments of the invention.

Multi-Touch Screen—A computer display which can track the position of multiple finger touches over time and allow software to respond to those touch events.

Multi-Touch Gesture—A distinct detectable pattern of one or more finger touches which can be mapped to an action in software.

Cyclic Parameter—A parameter whose representational value repeats after being increased or decreased by a fixed amount. An example would be an angular rotation.

Figure 1:
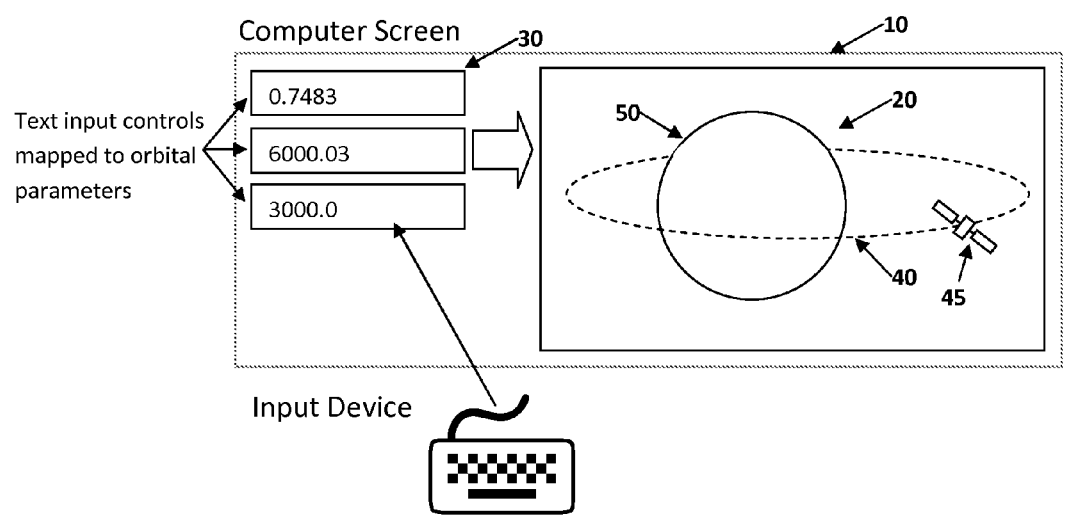
FIG. 1 is a diagram of a satellite orbit design with text input controls and a hardware keyboard.
Figure 2:
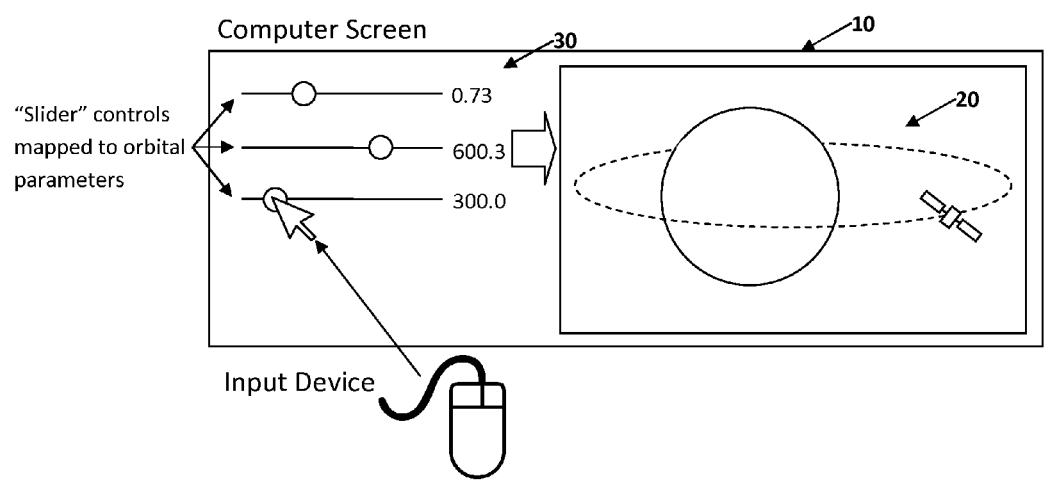
FIG. 2 is a diagram of satellite orbit design with a "slider" control and a mouse.
Figure 3:
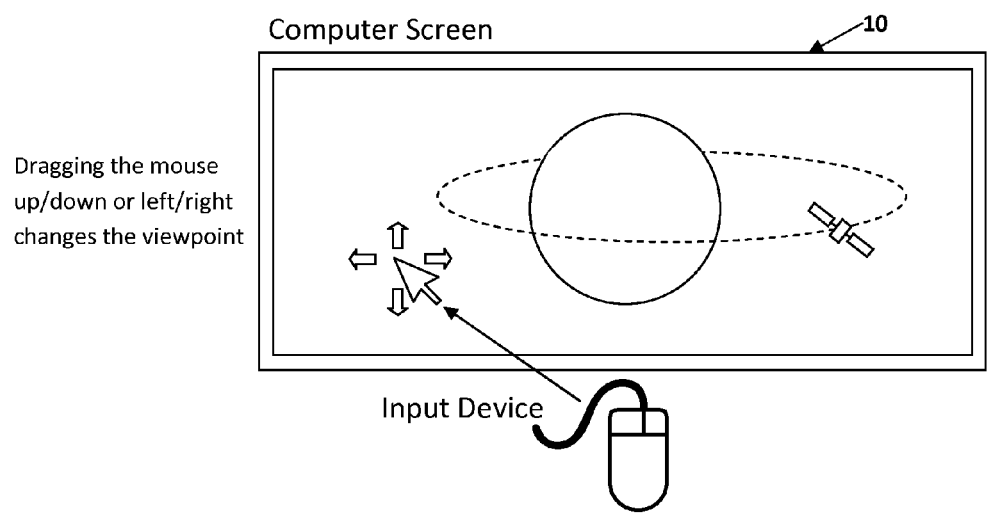
FIG. 3 is a diagram of changing the viewpoint with a mouse.
Figure 4:
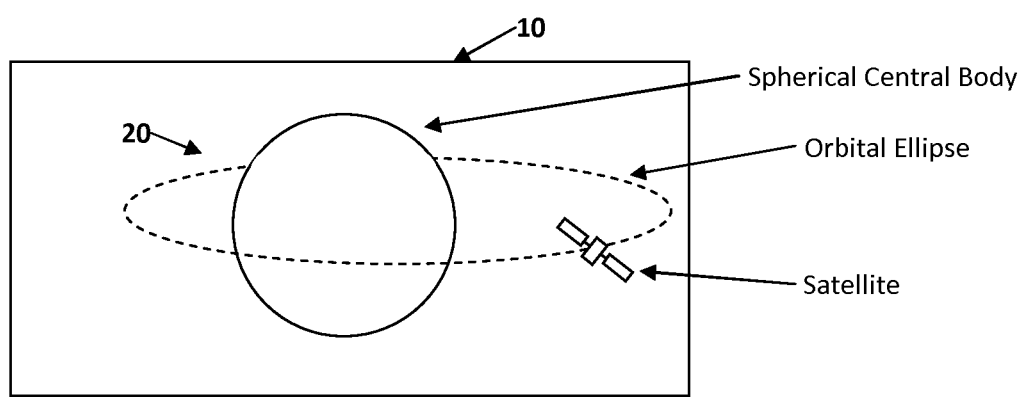
FIG. 4 is a diagram of orbit visualization, according to an embodiment of the invention.

FIG. 4 is a diagram of orbit visualization, according to an embodiment of the invention. According to an aspect of an embodiment, an orbit is a displayed path 40 of one or more object(s) 45 (body(ies)) of same or varying masses around a point (a central body) 50 and the orbit path 40 can be the representation of a physical orbit, for example, the gravitational orbit of a planet around a point in space near a star, man-made or otherwise satellite around a planet, etc.

As an example, in FIG. 4, in a orbit system 20, an idealized orbit 40 of a man-made satellite 45 around a heavy spherical central body 50, for example Earth, can be described by an ellipse 40 where the central body 50 is located at one foci of the ellipse 40. A primary task in astro-dynamic analysis is to design this orbit so as to achieve mission specific operational constraints. This design includes the shape and orientation of this ellipse 40 with respect to the central body 50, and the position of the satellite 45 on this ellipse 40 at a specified date and time. According to an aspect of an embodiment, the orbit system 20 is a still displayed image and/or a moving image (video).

For example, together with a date and time ("Epoch"), an orbit system 20 can be uniquely described by a collection of parameters known as an orbital element set 30. As an example, an element set and epoch are collectively known as a satellite's state. Many unique element set 30 representations exist which describe an orbit in different, but equivalent ways. One common example is the Keplerian element set which includes the following six parameters:

1. semi-major axis—Defined as ½ the distance of the longest axis of the ellipse. Qualitatively it describes the overall physical scale of the orbit.
2. eccentricity—Describes the shape of the orbit. A value of 0 describes a circular orbit while values between 0 and 1 describe an increasingly elongated ellipse.
3. inclination—Defined as the angle between the orbital plane and the equatorial plane of the central body. An orbit with a 0 degree inclination is coincident with the equatorial plane while an orbit with a 90 degree inclination passes over both planetary poles.
4. right ascension of the ascending node (RAAN)—Defined as the angle between the point where the orbit crosses the equatorial plane (the ascending node) of the central body and the vernal equinox.
5. argument of perigee—Defined as the angle from the point where the orbit crosses the equatorial plane (the ascending node), and the point in the orbit which is closest to the central body (perigee).
6. true anomaly—Defined as the angle between perigee and the current position of the satellite, referenced from the center of the central body.

Another element set example is the Cartesian element set which represents the position of an object, for example, a spacecraft, using the 3-dimensional Euclidean rectilinear vectors $R(X,Y,Z)$ and $V(V_X, V_Y, V_Z)$.

An orbital element can include an orbiting object 45, its position, orientation, timing/date on or around/near the orbit path 40, and/or a central body 50, its position, orientation, or other parameters for the central body 50. By utilizing multi-touch gestures of the embodiments on a touch screen computer interface, many of the disadvantages of the traditional approaches can be overcome. In this scheme the interface and the input device are unified into the orbit visualization and contextually mapped multi-touch gestures provide the control mechanism.

Figure 5:
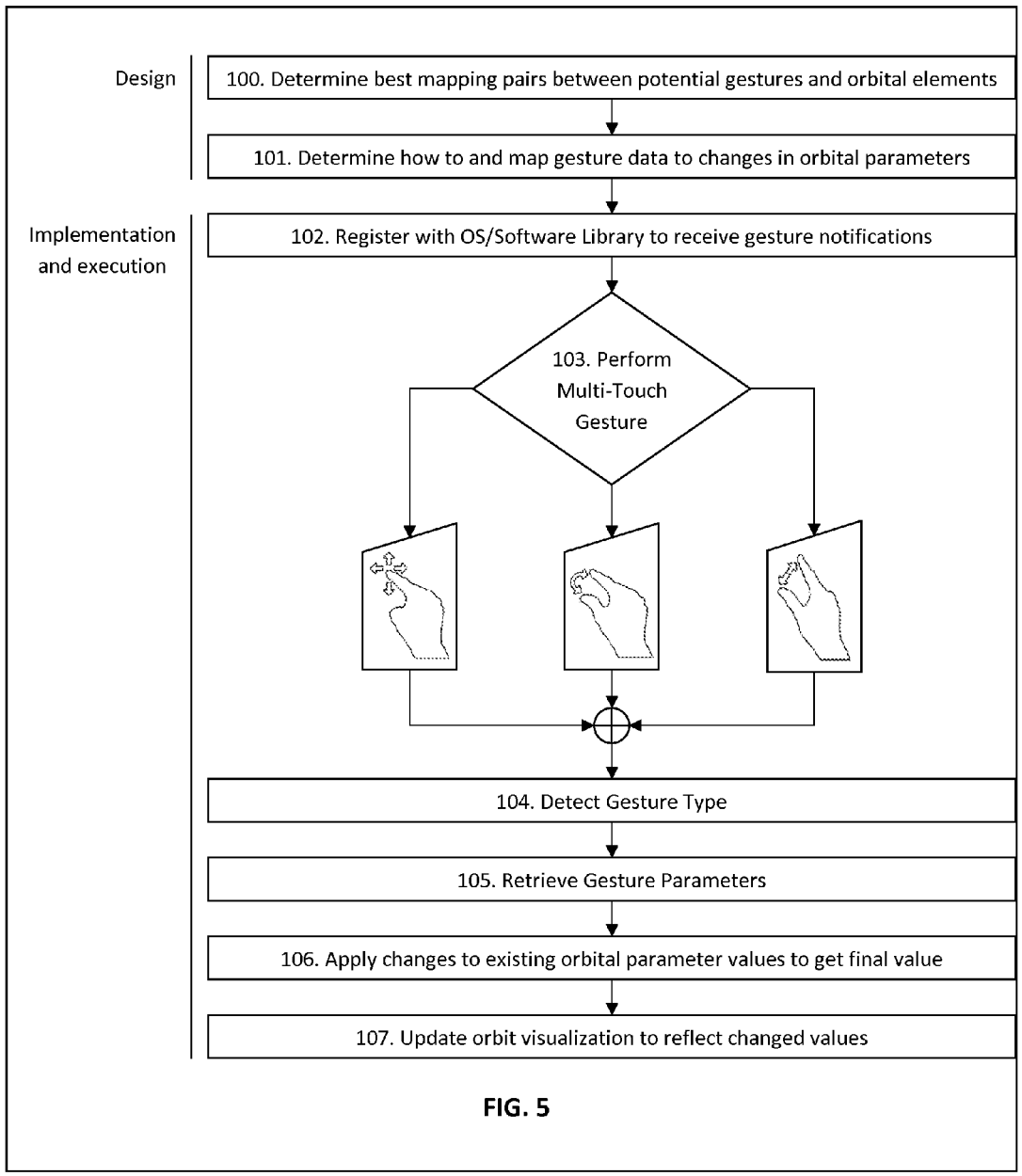
FIG. 5 is a flowchart of orbit design and operations, according to an embodiment of the invention.

FIG. 5 is a flowchart of the orbit design and operations of, according to an embodiment of the invention. In FIG. 5, at 100. Determine best mapping pairs between potential gestures and orbital elements 30. An example challenge is determining the potential gestures, for example, multi-touch gestures, to utilize and then mapping one of those gestures to each of the orbital elements being used. The following considerations are made:

As closely as possible, maintaining a one-to-one correspondence between the finger movements of the gesture and the resulting change to the visualized orbit.

Choosing a mapping that most closely reflects the numerical range of the orbital element with the physical range of the gesture pattern. This relates to whether or not the numerical range of the orbital element is a fixed interval (Semi-major Axis (SMA), Eccentricity (E)) or has a cyclic value. This then maps to the gesture type used to interface with that orbital property. This pertains to selecting a mapping between orbital elements with fixed-interval and cyclic ranges with pinch and rotate gestures. Once the corresponding mapping has been identified in the design phase, the mapping is then used to apply changes to existing orbital parameter values (FIG. 5—106). According to an aspect of an embodiment, a fixed interval orbital parameter is mapped to a pinch/zoom type gesture while a cyclic orbital parameter is mapped to a rotational type gesture.

Picking a gesture which requires the minimum amount of dexterity.

Picking a gesture which doesn't, by its execution, block areas of interest of the screen.

Minimizing the number of distinct gesture types required so as to minimize the learning curve of applications implementing this invention.

Avoid picking a set of gestures which may be similar to one another and therefore make unique detection difficult or impossible.

Working within the constraints of a screen size, for example, 10 inch screen, in the case of a small screen size, or very large screen size.

Figure 6A:
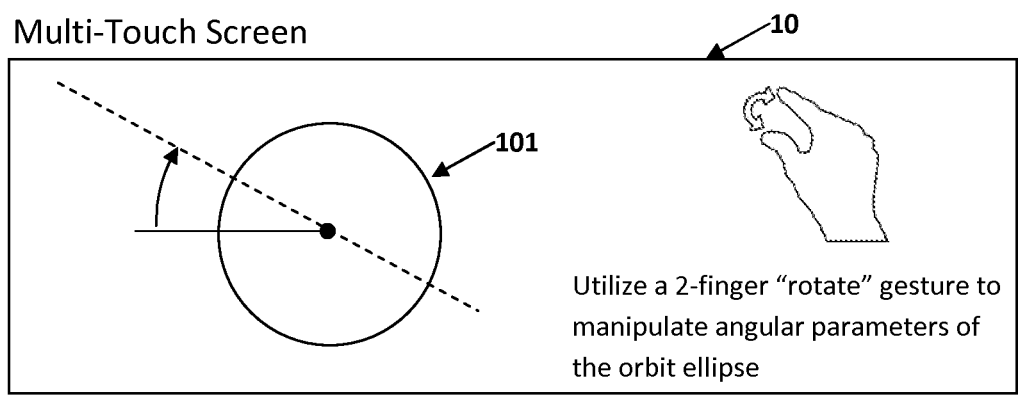
FIGS. 6A, 6B and 6C are diagrams of changing orbital parameters with a rotate gesture, according to an embodiment of the invention.

For a Keplerian orbital element set 30, elements can be grouped as affecting a defining distance/scale of the orbit (semi-major axis, eccentricity) or a defining angle of the orbit (inclination, right ascension of the ascending node, argument of perigee, true anomaly). Therefore, mapping a 2-finger rotate gesture to the angle elements (FIGS. 6A and 6B) and a 2-finger pinch/zoom gesture to the distance/scale (semi-major axis/eccentricity) orbital elements (FIG. 7) can achieve an optimal balance of the above considerations.

However, in case of Keplerian orbital elements, since there are 6 orbital elements but, for example, only 2 available gestures chosen, according to an aspect of an embodiment, a mechanism can be provided to select one element from each grouping to be active at once. Given a larger screen size constraint, another possibility is to modify each basic gesture to utilize additional fingers. For example, according to an aspect of embodiment, each of the 4 angle-based Keplerian elements could be mapped to a rotation gesture where 2, 3, 4, or 5 fingers are simultaneously touching the screen as the gesture is performed. This type of action might require a much greater amount of dexterity vs. manipulation of target number orbital elements.

Figure 8:
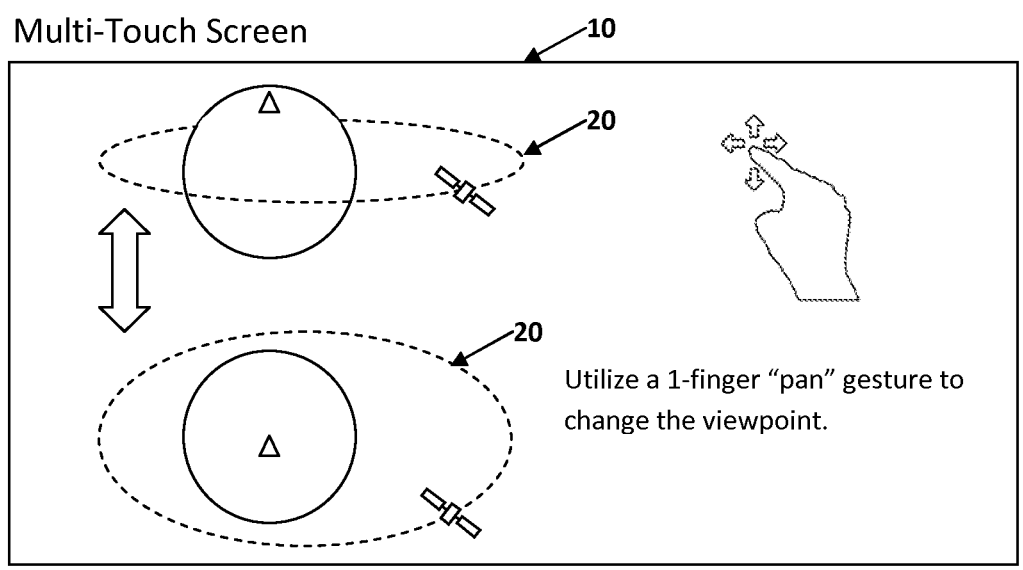
FIG. 8 is a diagram of changing a viewpoint with a pan gesture, according to an embodiment of the invention.

In FIG. 8, a result of changing of the viewpoint or orientation with a Pan Gesture can be displayed on a single display screen (above) and/or in separate screen areas simultaneously and/or switchable between different display screen showing various orientations.

In addition, any of the gestures can be provided singly or in combination with each other and/or other gestures. For example, the "pan" gesture can be combined with a rotation gesture to either provide a rotated orientation and/or manipulate angular parameters among any of the orbit(s) and/or central body(ies). According to an aspect of an embodiment, viewpoint of an orbit in relation to a central body can be changed according to one or more gestures on a touch screen and/or in a three dimensional air space that are directly mapped to one or more orbital elements to change orbit view point(s) (e.g., a gesture directly affects view point of a displayed orbit in relation to a central body and/or vice versa).

According to an aspect of an embodiment, in a computer displayed visual orbit system 20 that includes one or more displayed central objects 50 and one or more displayed other orbiting objects 45 that orbit the central objects 50 in one or more orbit path 40 shapes (e.g., ellipse, circle, etc.), size, orientations and/or positions of the orbiting objects 45 on the orbit paths 40, a gesture is mapped to one or more target orbital elements 30 as parameters for one or more of target objects (40, 45, 50) in the orbit system 20 (e.g., central and/or orbital objects) for a visual change in one or more of orbit shape, size, orientation and/or a position of a target object in relation to one or more other objects in the orbit system and/or vice versa, and where a form of a gesture provides a graphical integration to a change in orbit visualization. In other words, the gesture is directly correlated to a target orbital element for a target object being manipulated in the orbit system 20.

The embodiments of the present invention relate to the ability to design and explore on a computer display an object (e.g., a satellite) orbiting another object (e.g., a spherical central body) more intuitively than traditional methods by utilizing gestures (e.g., touch gestures) directly co-relatable to a target visual change of one or more orbital elements 30 of an orbit system 20 on a computational device (e.g., computer, tablet computer, mobile phone) equipped with gesture detector, such as a touch screen interface. According to another aspect of an embodiment, the orbital elements 30 are a representation (virtualization) of actual or physical orbital elements in an actual or physical orbit system, such as a planetary system, satellites of earth, etc., where a gesture provides a direct conversion by a gesture of actual orbital elements and changes in actual orbital elements on a displayed representation of an actual orbit system.

According to an aspect of an embodiment, display of orbital elements are obviated or made unnecessary (see FIG. 4). According to another aspect of an embodiment, relevant (e.g., historical) orbital elements can be displayed upon (during) and/or after a gesture. According to another aspect of an embodiment, for an orbit of an object (e.g., satellite), a position and timing of the position of the orbiting object can be determined and output (e.g., displayed) according to a gesture that is a mapping of a group of (two or more) orbital elements for the orbiting object without individual manipulation of orbital elements. The grouping of orbital elements can be determined via a gesture.

In FIG. 5, at 101. Determine how to map gesture data to changes in orbital parameters. Software libraries supporting multi-touch gesture detection only report generalized data contextualized to a particular gesture. The question thus arises of how best to translate this raw data into changes in the mapped orbital parameter.

Figure 6B:
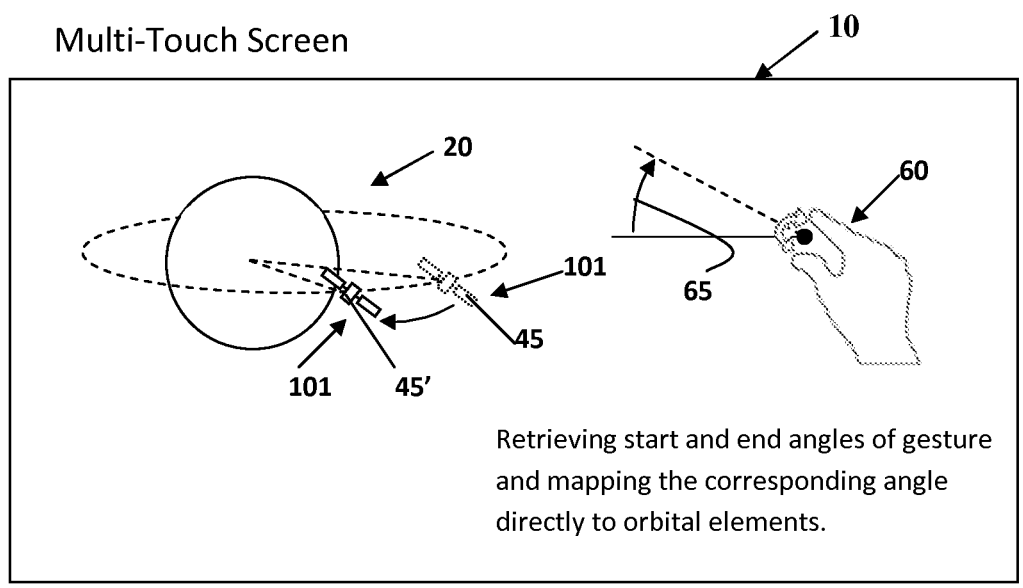
Figure 6C:
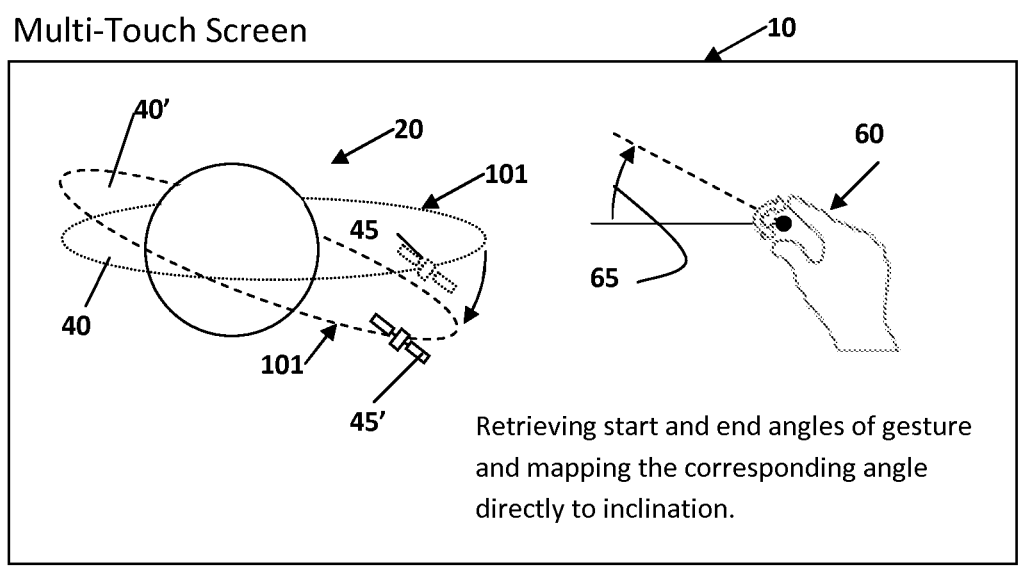
Figure 7:
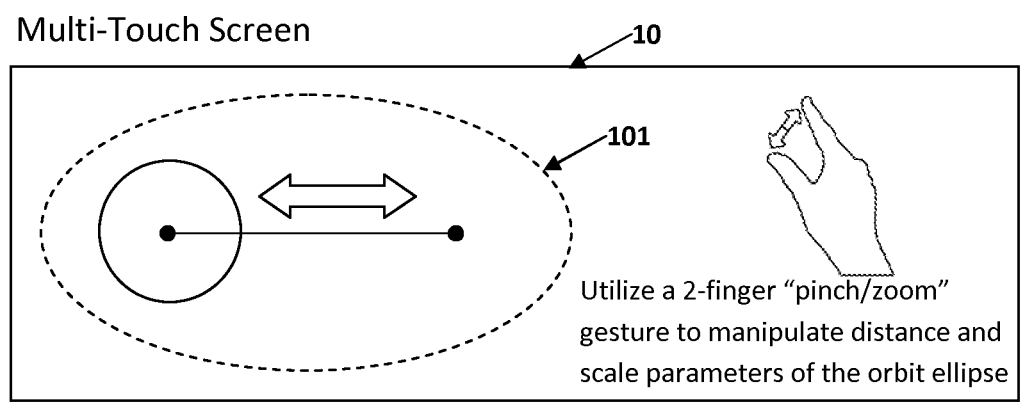
FIG. 7 is a diagram of changing distance and/or scale orbital parameters with a pinch and/or zoom gesture, according to an embodiment of the invention.

In the case of a rotation gesture, with reference to FIG. 6B, the angle 65 between the vector currently (subsequent to rotation) formed by the fingers and the vector formed by the fingers at the start of the gesture can be retrieved. Adding this angle 65 directly to the initial value of an orbital angular parameter at the start of the gesture can provide a good solution. For example, in FIG. 6B, a plurality of orbital parameters of Inclination, RAAN, Argument of Perigee and True Anomaly can be unifyingly controlled by a single rotation gesture 60. In the case where the axis of rotation is normal to the surface of the screen this achieves an almost one-to-one behavior with respect to one or more orbital parameters. For example, in FIG. 6B, for a rotation gesture 60, fingers are rotated in a clockwise direction, which causes one or more orbital parameters of Inclination, RAAN, Argument of Perigee and True Anomaly to be changed. In addition, a selection of which one of the relevant orbital parameters to be controlled by the gesture 60 can be by the same gesture 60 during performance of the gesture 60, for example, a gesture that additionally includes other (one or more other) movement or tapping of one or more fingers, or sliding motions, or detectable by a camera movements of the fingers or hand or wrist or twists, in a direction (up, down, left, right, rotational, or intervals therebetween, in relation to the display screen or an arbitrary plane, or by a separate second simultaneous gesture (e.g., a second hand/finger movement). Therefore, a single gesture can simultaneously unify control of a plurality of orbital parameters of an orbital system to simultaneously control orbital geometries of components or elements (e.g., 40, 45, 50) of the orbital system 20. In case of Cartesian orbital elements one or more orbital coordinates are mapped to a gesture. FIG. 6C illustrates how the same single rotational gesture 60 can be mapped to different orbital element(s) in relation to FIG. 6B, for example, the Inclination orbital parameter is emphasized in FIG. 6C. For example, in FIG. 6C, for a rotation gesture 60, fingers of a person are rotated in a clockwise direction, which causes the selected orbital parameter, Inclination, to change accordingly. In FIG. 6C, adding the angle 65 directly to the initial value of an orbital angular and/or rotational parameter at the start of the gesture can provides a good solution.

In the case of a pinch/zoom gesture, the ratio of the distance between the fingers at their current positions and the distance between the fingers at the start of the gesture can be retrieved. In this case, the initial value of the distance/scale orbital parameter can be multiplied by the ratio to get a new value. However, to make sure the reaction to the gesture has an intuitive sensitivity, an additional scale factor should be applied. This scale factor might best be determined by empirical experimentation.

In other words, at 101, a difference between starting position of a target gesture and an ending position of the target gesture is factored into (e.g., add, multiply, subtract, etc.) to one or more target orbital elements for the target gesture while the target gesture is being performed.

In FIG. 5, at 102, Register with OS/Software Library to receive gesture notifications. In order to receive notifications of the start, execution, and end of a specified gesture type, a sequence of function calls to register a particular gesture type must be made to the OS or software library which supports gesture detection, for example, multi-touch gesture detection.

In FIG. 5, at 103, Perform Gesture, for example, Multi-Touch Gesture. In case of multi-touch gestures, an end-user would execute one of the registered gesture types by performing the prescribed motion while the appropriate number of fingers maintain contact with the touch screen display.

In FIG. 5, at 104, Detect Gesture Type. While a primary OS or software library function may perform the initial detection of a specific gesture type, additional work is necessary to avoid conflicts between multiple registered gesture types. For example, while performing a rotation gesture it can be difficult for an end user to keep the distance between the 2 fingers identical over the range of the gesture. This unintentional change in finger distance can trigger the detection of a pinch/zoom gesture. The reverse scenario can occur with a pinch/zoom gesture as well. In order to avoid this conflict, a threshold can be introduced. This threshold has two effects. Initially, the threshold prevents any change in orbital parameter value, in other words the gesture is ignored, until the threshold is met. For example, in the case of a rotation gesture, this threshold will be a constant angle to be compared against the angular change retrieved from the gesture detection software library. The second effect of the threshold is then to prevent the detection of a different gesture during the execution of the first gesture. For example, a pinch/zoom gesture will not be processed until the rotation gesture ends and vice versa. Care must be taken in choosing a threshold large enough that an erroneous detection of the intended gesture doesn't occur, but small enough so that the end-user doesn't perceive a necessity for a large change before an action occurs. In other words, the behavior should appear seamless and natural to the end-user. The value of the threshold can be device dependent and might best determined by empirical experimentation.

In FIG. 5, at 105. Retrieve Gesture Parameters. After a gesture detection notification is received, the corresponding value change of the gesture can be retrieved using a gesture detection software library and then post processed as prescribed in 101.

In FIG. 5, at 106. Apply changes to existing orbital parameter values to get final value. The gesture parameters can be applied to determine the altered orbital element value by executing the following sequence:

1. Detect gesture start (104)
2. Retrieve initial value of orbital parameter mapped to detected gesture
3. Retrieve gesture parameter (105)
4. Post-Process gesture parameter value as prescribed in 101 when detected that a gesture is complete. The end-user could be prompted to confirm a gesture is complete.
5. Update retrieved mapped orbital parameter based upon the post processed gesture parameter value.

In FIG. 5, at 107. Update orbit visualization to reflect changed values. The orbit visualization can then be re-rendered using the new set of orbital parameters (the updated orbital parameters based upon the post processed gesture values). This new rendering reflects the changes the user invoked by performing the gesture.

This design addresses problems with the traditional control schemes in several ways:

The mapped gesture provides context for the value being manipulated. Rotation gestures directly correspond to a rotational orbital parameter. Pinch/Zoom gestures directly correspond to distance/scaling parameters.

The integration of the visualization and control surface eliminates the need for the user to make a conceptual connection between distinct interface elements.

The integration of orbit and viewpoint manipulation schemes, through the use of a single unifying set of gestures, eliminates another unnecessary conceptual shift during the design process. The "unifying set of gestures" (i.e., pan, pinch/zoom, and rotational gestures) are used to provide a common manipulation scheme for interacting with the viewpoint and orbital geometries. This allows for gestures to be multi-purposed in the design of the invention. In addition, according to another aspect of an embodiment, a single gesture can simultaneously unify control of a plurality of orbital parameters of an orbital system to simultaneously control orbital geometries.

Because a gesture, for example the rotation gesture, has no boundary, the continuous cyclic nature of the underlying angular data is preserved.

Although an embodiment has been discussed within the context of a single satellite orbit, it is applicable to multiple simultaneous orbit designs with the addition of a method to select which satellite orbit would be altered by the changes invoked by the execution of multi-touch gestures. This selection could be performed, for example, by "tapping" the visual representation of an orbiting object 45 on the multi-touch screen, and/or by selecting its designated label from a list.

Although an embodiment has been described in the context of gestures (for example, hand and/or finger of person gestures) performed on a multi-touch screen, a similar concept could be employed given a device which could detect touchless person gestures, such as body movement gestures performed in the air and mapped to orbital elements. For example, you could twist your arm for a rotation, turn your head side to side to change the viewpoint, or bring your hands closer together or farther apart for a scaling action, in relation to orbital elements.

An example application of this invention is the rapid prototyping of a satellite orbital geometry. For example, a user could quickly and intuitively design an orbit which passed over North America at a specified epoch.

Another example application of this invention is in space visualization generation where the primary concern is achieving an aesthetically pleasing result. The visualizations might be for movies/television, education, games, or demonstration purposes.

The embodiments of this invention may be implemented by computing hardware and/or software, for example, via one or more of the following components:

A digital computational device equipped with a multi-touch capable display and/or gesture detection.

Software libraries capable of processing multi-touch events and/or gesture events.

Software libraries capable of detecting multi-touch and/or touchless gestures and reporting the parameters that define their state.

Software libraries capable of rendering a satellite orbit visualization.

Figure 9:
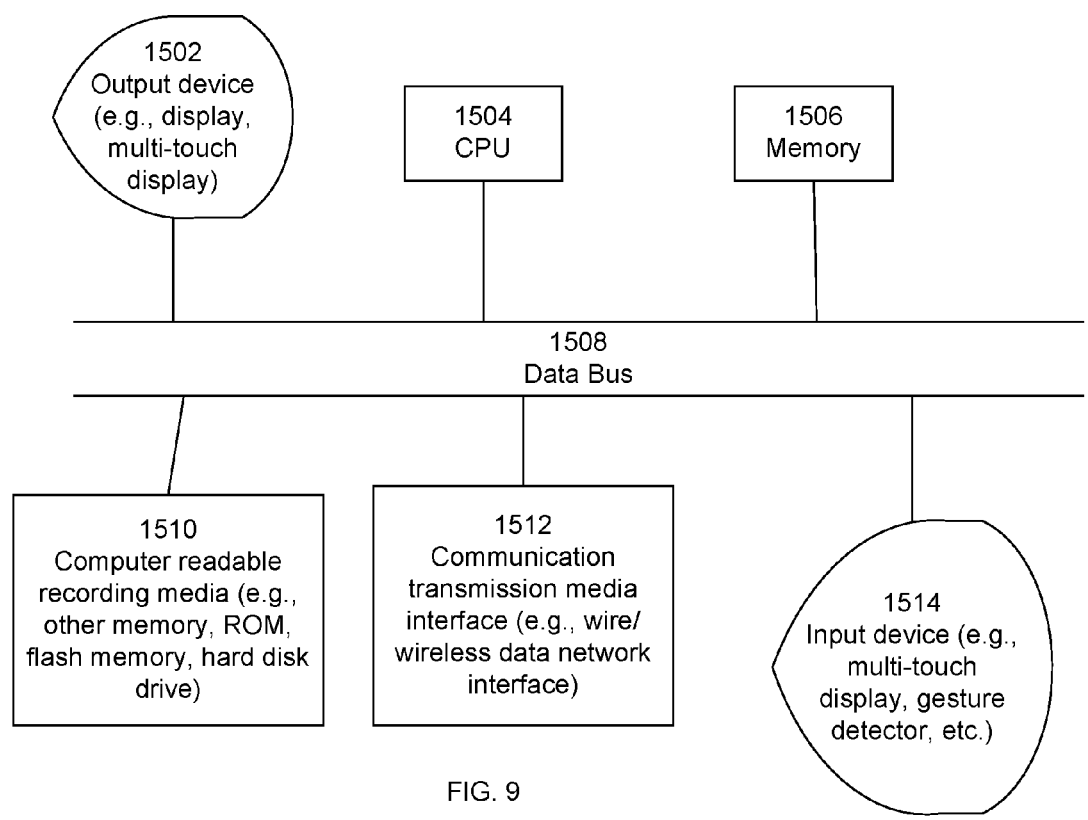
FIG. 9 is a functional block diagram of a computer for the embodiments of the invention.

FIG. 9 is a functional block diagram of a computer (hardware computing machine) for the embodiments of the invention, namely a computer configured to execute a gesture based orbit designer. In FIG. 9, the computer can be any computing device that can execute instructions to provide the described functions. Typically, the computer includes an input device 1514 (such as a multi-touch display screen, a gesture detector), output device 1502, for example, a display to display a user interface or output information, printer, a cash dispenser, etc. One or more computer controller(s) or processing cores 1504 (e.g., a hardware central processing unit) executes instructions (e.g., a computer program or software) that control the apparatus to perform operations. According to an aspect of an embodiment, one or more networked computer servers, each with a number of processing cores, execute the described operations in which orbit visualization is rendered (as changed) according to input gestures.

Typically, a memory component 1506 stores the instructions for execution by the controller 1504. According to an aspect of an embodiment, the apparatus reads/writes/processes data of any computer readable recording media 1510 and/or communication transmission media interface 1512. The communication transmission media interface is to data network with one or other machines (e.g., computers) to execute the described functions. The embodiments can be implemented via grid computing. The display 1502, the CPU 1504 (e.g., hardware logic circuitry based computer processor that processes instructions, namely software), the memory 1506, the computer readable media 1510, and the communication transmission media interface 1512 are in communication by one or more the data bus(es) 1508.

According to an aspect of the embodiments of the invention, any combinations of one or more of the described features, functions, operations, and/or benefits can be provided. A combination can be one or a plurality. The embodiments can be implemented as an apparatus (a machine) that includes hardware for performing the described features, functions, operations, and/or benefits, for example, hardware to execute instructions or software, for example, computing hardware (i.e., computing apparatus), such as (in a non-limiting example) any computer or computer processor that can store, receive, retrieve, process and/or output data and/or communicate (network) with other computers. According to an aspect of an embodiment, the described features, functions, operations, and/or benefits can be implemented by and/or use computing hardware and/or software. For example, an orbit designer can comprise a computing controller (CPU) (e.g., a hardware logic circuitry based computer processor that processes or executes instructions, namely software/program), computer readable media, transmission communication interface (network interface), input device, and/or an output device, for example, a display device, and which can be in communication among each other through one or more data communication buses. In addition, an apparatus can include one or more apparatuses in computer network communication with each other or other devices. In addition, a computer processor can refer to one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display. An apparatus or device refers to a physical machine that performs operations, for example, a computer (physical computing hardware or machinery) that implement or execute instructions, for example, by way of software, which is code executed by computing hardware, and/or by way of computing hardware (e.g., in circuitry, etc.), to achieve the functions or operations being described. The functions of embodiments described can be implemented in any type of apparatus that can execute instructions or code. More particularly, programming or configuring or causing an apparatus or device, for example, a computer, to execute the described functions of embodiments of the invention creates a new machine where in case of a computer a general purpose computer in effect becomes a special purpose computer once it is programmed or configured or caused to perform particular functions of the embodiments of the invention pursuant to instructions from program software.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A device coupled to a touch screen display, the device comprising:
    a computer processor that executes:
        associating a detected multi-touch gesture on the touch screen display with a corresponding change to one or more orbital parameters within a displayed orbit system without use of an intermediary user-interface element, wherein:
            the displayed orbit system includes a central object,
            the displayed orbit system includes an orbital object on an orbit path around the central object, and
            the orbital parameters represent one or more of orbital object position, orbital path shape, orbital path position, or orbital path orientation; and
        directly without using an intermediary user-interface element changing an orbital parameter of the displayed orbit system according to defining parameters of the detected multi-touch gesture, causing a change in visualization of the orbital object in relation to the central object responsive to the changed orbital parameter of the displayed orbit system.

2. The device of claim 1, wherein a group of two or more orbital parameters are correlated to the multi-touch gesture.

3. The device of claim 1, wherein the changing of the orbital parameter of the displayed object comprises mapping a value of a fixed interval orbital parameter to a pinch type multi-touch gesture while a value of a cyclic orbital parameter is mapped to a rotational type multi-touch gesture.

4. The device of claim 1, wherein the orbital parameters comprise an orbital object position on an orbital path at a time and a date, and the direct changing of the orbital parameter further comprises calculating a position of the orbital object on the orbit path at a time and date in response to the defining parameters of same multi-touch gesture.

5. A method implemented by a computing apparatus capable of being coupled to a touch screen display, comprising:
    controlling a computer processor to execute:
        associating a detected multi-touch gesture on the touch screen display with a corresponding change to one or more orbital parameters within a displayed orbit system without use of an intermediary user-interface element, wherein:
            the displayed orbit system includes a central object,
            the displayed orbit system includes an orbital object on an orbit path around the central object, and
            the orbital parameters represent one or more of orbital object position, orbital path shape, orbital path position, or orbital path orientation; and
        directly without using an intermediary user-interface element changing an orbital parameter of the displayed orbit system according to defining parameters of the detected multi-touch gesture, causing a change in visualization of the orbital object in relation to the central object responsive to the changed orbital parameter of the displayed orbit system.

6. A non-transitory computer readable medium storing a program that causes a computer to execute the method of claim 5.

* * * * *